US012594870B1

(12) United States Patent
Doubek

(10) Patent No.: US 12,594,870 B1
(45) Date of Patent: Apr. 7, 2026

(54) FIFTH WHEEL FISH HOUSE HEIGHT ADJUSTABLE CONNECTION

(71) Applicant: John R. Doubek, Albany, MN (US)

(72) Inventor: John R. Doubek, Albany, MN (US)

( * ) Notice: Subject to any disclaimer, the term of this patent is extended or adjusted under 35 U.S.C. 154(b) by 487 days.

(21) Appl. No.: 18/174,613

(22) Filed: Feb. 25, 2023

(51) Int. Cl.
*B60P 3/34* (2006.01)
*B62D 53/08* (2006.01)
*E04H 15/00* (2006.01)

(52) U.S. Cl.
CPC ............ *B60P 3/34* (2013.01); *B62D 53/0842* (2013.01); *E04H 15/001* (2013.01)

(58) Field of Classification Search
CPC . B62D 53/0842; E04H 15/001; B60F 3/0069; B60F 3/0092
See application file for complete search history.

(56) References Cited

U.S. PATENT DOCUMENTS

| | | |
|---|---|---|
| 2,452,789 A | 11/1948 | Pike |
| 2,568,283 A | 9/1951 | Harpster |
| 2,590,181 A | 3/1952 | Keesler |
| 2,590,210 A | 3/1952 | Rogers |
| 2,605,916 A | 8/1952 | Martin |
| 2,611,496 A | 9/1952 | Martin |
| 2,653,827 A | 9/1953 | Manning |
| 2,656,195 A | 10/1953 | Martin |
| 2,687,225 A | 8/1954 | Martin |
| 2,717,707 A | 9/1955 | Martin |
| 2,772,008 A | 11/1956 | Martin |
| 2,774,497 A | 12/1956 | Martin |
| 2,806,710 A | 9/1957 | Mascaro |
| 2,858,950 A | 11/1958 | Martin |
| 2,894,764 A | 7/1959 | Ronk |
| 2,967,720 A | 1/1961 | Smith et al. |
| 3,215,449 A | 11/1965 | Talbert |
| 3,419,169 A | 12/1968 | James |
| 3,429,585 A * | 2/1969 | Ross .................... B62D 53/065 |
| | | 280/43.23 |
| 3,517,944 A | 6/1970 | Hage |
| 3,527,476 A | 9/1970 | Winckler |
| 3,536,340 A | 10/1970 | Talbert |
| 3,756,443 A | 9/1973 | Verschage et al. |
| 3,894,645 A | 7/1975 | Verschage |

(Continued)

FOREIGN PATENT DOCUMENTS

EP                515294 A1    11/1992

*Primary Examiner* — Karen Beck
(74) *Attorney, Agent, or Firm* — Albert W. Watkins

(57) ABSTRACT

An ice fishing house trailer defines an enclosure having many amenities, including at least one ice fishing portal in the floor. The ice fishing house trailer is height adjustable between a travel position and an ice-contacting position, while remaining securely coupled to a towing vehicle through a fifth wheel or equivalent coupler. A storage compartment is affixed with and generally above the fifth wheel coupler. A quadrilateral linkage couples the ice fishing house body and storage compartment, enabling the two to shift relative to each other about a generally vertical axis. The quadrilateral linkage is driven by a suitable drive cylinder. To lower the ice fishing house body down to the ice, the drive cylinder is actuated, lowering the front of the ice fishing house body first. Subsequent thereto, the back of the ice fishing house body is lowered relative to trailer wheel set.

8 Claims, 5 Drawing Sheets

(56)  References Cited

U.S. PATENT DOCUMENTS

| 4,078,684 | A |   | 3/1978 | Hasenberg et al. | |
| 4,103,793 | A |   | 8/1978 | Weaver | |
| 4,120,513 | A | * | 10/1978 | Hurt | B62D 53/065 |
|  |  |  |  |  | 280/43.23 |
| 4,164,297 | A |   | 8/1979 | Dorwin | |
| 4,219,211 | A |   | 8/1980 | Sauers | |
| 4,296,941 | A |   | 10/1981 | Van Wassenhove | |
| 4,302,022 | A |   | 11/1981 | Schoeffler et al. | |
| 4,367,884 | A |   | 1/1983 | Johnson et al. | |
| 4,372,572 | A |   | 2/1983 | Verschage | |
| 4,390,192 | A |   | 6/1983 | Wagner | |
| 4,423,885 | A |   | 1/1984 | Camey et al. | |
| 4,618,307 | A |   | 10/1986 | Kress et al. | |
| 5,326,214 | A |   | 7/1994 | Swisher, Jr. | |
| 5,667,231 | A |   | 9/1997 | Dierks et al. | |
| 5,775,713 | A |   | 7/1998 | Peterson et al. | |
| 6,378,887 | B2 |   | 4/2002 | Landoll et al. | |
| 7,112,029 | B1 |   | 9/2006 | Neatherlin | |
| 7,544,033 | B1 |   | 6/2009 | Mollhagen | |
| 8,336,905 | B1 |   | 12/2012 | Mollhagen et al. | |
| 9,440,624 | B2 |   | 9/2016 | Lewis | |
| 2003/0044265 | A1 |   | 3/2003 | French et al. | |
| 2006/0186643 | A1 | * | 8/2006 | LaBore | B60P 1/027 |
|  |  |  |  |  | 280/38 |
| 2009/0134600 | A1 | * | 5/2009 | Tinley | B62D 21/20 |
|  |  |  |  |  | 296/182.1 |
| 2010/0019469 | A1 |   | 1/2010 | Groves | |
| 2012/0056406 | A1 |   | 3/2012 | Trowbridge et al. | |
| 2012/0056407 | A1 |   | 3/2012 | Trowbridge et al. | |
| 2015/0283934 | A1 |   | 10/2015 | Kern | |
| 2016/0318360 | A1 | * | 11/2016 | Harvey | B62D 53/005 |

* cited by examiner

FIFTH WHEEL FISH HOUSE HEIGHT ADJUSTABLE CONNECTION

BACKGROUND OF THE INVENTION

1. Field of the Invention

The present invention pertains generally to ice fishing houses that provide shelter from the winter elements and other amenities to one or more fishermen. In a preferred manifestation, the ice fishing house is a trailer that is height adjustable between a travel position and an ice-contacting position while remaining securely coupled to a towing vehicle through a fifth wheel coupler.

2. Description of the Related Art

There are a large variety of commercially available ice fishing houses. Some of these are similar to pre-manufactured housing in that they are partially assembled and packaged at a factory, and then shipped to a retail outlet or directly to a purchaser. Ultimately, the purchaser will transport the partially assembled structure to the ice above a lake or other body of water. The purchaser will then reassemble the ice fishing house, where it will typically remain throughout the ice fishing months. At the end of the ice fishing season, most preferably well in advance of the spring thaw, the ice fishing house will then be partially disassembled and transported by the purchaser back to a suitable storage location until the next ice fishing season arrives. Unfortunately, during the course of the winter there will typically be some variety of snow, thaw, and re-freezing. This temperature cycling tends to lock the ice fishing house into an aggregation of snow and ice, many years making timely removal of the ice fishing house from the ice in the spring far more difficult than the original assembly at the beginning of the winter season.

As may be appreciated, this assembly and disassembly requires significant labor each season. Unfortunately, once the ice fishing house is assembled, it is difficult to transport without again partially disassembling the ice fishing house. This means that this type of fish house will normally be placed in a single location for the entire season, meaning the fisherman is limited to using the ice fishing house on only one of these lakes for the entire year. While for exemplary purposes only, Minnesota is known as "the land of 10,000 lakes," which means that the use of this type of fish house will limit the person to only one lake of the more than 10,000 to choose from, and will often limit the person to a single location on that lake.

In contrast, there are several more portable ice fishing shelters. One of these is essentially a tent, manufactured from a frame and fabric. A person can readily pop up or assemble this type of ice fishing house. However, as may be appreciated, this type of ice fishing house provides much less protection from the elements than most more rigid and rugged ice fishing houses. With the consideration that the nights in Minnesota can and often do drop to temperatures of −40 degrees, Celsius and Fahrenheit which are equal at this very cold temperature, the lack of adequate shelter can render such a tent-like structure very uncomfortable. Further, there are essentially no amenities in such tent-like structures other than the shelter from direct exposure to the elements.

For persons who wish to pursue fishing a variety of lakes, but that also desire more shelter and amenities than are provided by the tent-like shelters, a number of manufacturers have devised trailers that can be towed behind various vehicles. Many of these ice fishing trailers are relatively small, providing good mobility but once again limiting the number of person that can take shelter and also limiting the number of amenities that are found in the ice fishing house. Often such smaller trailers provide only fishing hole access and one or a few fold-away beds.

As the amenities increase, such as but not limited to the provision of better structure and thermal insulation, heating appliances, sleeping quarters for multiple persons, kitchen facilities, and a built-in bathroom, the size and weight of the trailer also necessarily increases. These better equipped trailers require much higher capacity hitches to couple with the towing vehicle. For exemplary and comparative purposes only, a basic class I hitch commonly has a maximum towing capacity of 2,000 pounds, which is commonly only adequate for a typical small uncovered utility trailer with a moderate load. A class II hitch is commonly rated for a towing capacity of 3,500 pounds, which is adequate for a larger 4'×8' uncovered utility trailer with moderate load, or a pop-up style or folding camper with nominal amenities. However, the more well equipped empty weight trailers often come in at weights ranging from 3,500 to 15,000 pounds, and can have a functional gross vehicle weight when fully stocked at from around 6,000 to 20,000 pounds. Fifth wheel and gooseneck couplers are commonly rated for 20,000-30,000 pound GVW loads. Consequently, in order to obtain the best amenities, these trailers most commonly require either a gooseneck or fifth wheel coupler.

Since these trailers are inherently large, it is also desirable to provide the desired amenities and storage in as short an overall length of trailer as reasonably possible. In consideration thereof, such trailers commonly extend at the leading portion over the gooseneck or fifth wheel coupler.

Unfortunately, these higher weight gooseneck or fifth wheel coupler trailers must be disconnected from the towing vehicle in order for the ice fishing trailer to be lowered into contact with or into a position suitably close to the ice to permit ice fishing from inside the ice fishing trailer. As can be appreciated, it is highly undesirable to have to disconnect the trailer from the towing vehicle for use and then reconnect the trailer for transport knowing that the outside temperatures can be extremely cold and the couplings can be difficult to operate, often covered in snow or ice.

In the broader field of utility trailers, some artisans have devised various gooseneck style couplers that provide pivotal, detachable, or various ground engaging apparatus, most commonly to enable either more ready separate detachment of the trailer while keeping the gooseneck coupler still attached to the towing vehicle or to allow some portion of the trailer either adjacent to the gooseneck or distal thereto to be lowered to the ground to facilitate loading of heavy machinery onto the trailer bed. Exemplary U.S. and Foreign patents and published applications, the teachings which are incorporated herein by reference, include: U.S. Pat. No. 2,452,789 by Pike, entitled "Trailer"; U.S. Pat. No. 2,568, 283 by Harpster, entitled "Low bed trailer unit"; U.S. Pat. No. 2,590,181 by Keesler, entitled "Power manipulated detachable gooseneck for trailers"; U.S. Pat. No. 2,590,210 by Rogers, entitled "Detachable fluid pressure operated gooseneck for trailers"; U.S. Pat. No. 2,605,916 by Martin, entitled "Bed ramp trailer"; U.S. Pat. No. 2,611,496 by Martin, entitled "Foldable trailer hitch"; U.S. Pat. No. 2,653, 827 by Manning, entitled "Vertically adjustable truck trailer"; U.S. Pat. No. 2,656,195 by Martin, entitled "Interchangeable dual trailer coupling pin"; U.S. Pat. No. 2,687, 225 by Martin, entitled "Mobile trailer bridge"; U.S. Pat.

No. 2,717,707 by Martin, entitled "Tilting platform trailer"; U.S. Pat. No. 2,772,008 by Martin, entitled "Method of spotting pivotal centers for swinging link structure of folding gooseneck trailer hitch"; U.S. Pat. No. 2,774,497 by Martin, entitled "Notched gooseneck trailer construction"; U.S. Pat. No. 2,806,710 by Mascaro, entitled "Trailer having vertically adjustable wheels and hitch"; U.S. Pat. No. 2,858,950 by Martin, entitled "Heavy duty bed ramp trailer"; U.S. Pat. No. 2,894,764 by Ronk, entitled "Trailer-tractor assembly with removable gooseneck"; U.S. Pat. No. 2,967,720 by Smith et al, entitled "Detachable gooseneck for trailers and the like"; U.S. Pat. No. 3,215,449 by Talbert, entitled "Detachable gooseneck assembly"; U.S. Pat. No. 3,419,169 by James, entitled "Power actuated folding gooseneck trailer"; U.S. Pat. No. 3,429,585 by Ross, entitled "Variable height trailer unit"; U.S. Pat. No. 3,517,944 by Hage, entitled "Hydraulic mechanism for raising and lowering flat bed trailers"; U.S. Pat. No. 3,527,476 by Winckler, entitled "Combination towing vehicle and trailer and hitch assembly therefor"; U.S. Pat. No. 3,536,340 by Talbert, entitled "Hinged assembly for coupling tractor and trailer"; U.S. Pat. No. 3,756,443 by Verschage et al, entitled "Folding gooseneck trailer"; U.S. Pat. No. 3,894,645 by Verschage, entitled "Folding gooseneck trailer"; U.S. Pat. No. 4,078,684 by Hasenberg et al, entitled "Folding gooseneck trailer and method"; U.S. Pat. No. 4,103,793 by Weaver, entitled "Folding gooseneck trailer with positioning system"; U.S. Pat. No. 4,120,513 by Hurt, entitled "Implement trailer"; U.S. Pat. No. 4,164,297 by Dorwin, entitled "Folding gooseneck for trailer"; U.S. Pat. No. 4,219,211 by Sauers, entitled "Trailer connection means"; U.S. Pat. No. 4,296,941 by Van Wassenhove, entitled "Folding gooseneck assembly"; U.S. Pat. No. 4,302,022 by Schoeffler et al, entitled "High-low trailer"; U.S. Pat. No. 4,367,884 by Johnson et al, entitled "Removable gooseneck for trailers"; U.S. Pat. No. 4,372,572 by Verschage, entitled "Lift bed tandem axle trailer"; U.S. Pat. No. 4,390,192 by Wagner, entitled "Trailer gooseneck apparatus"; U.S. Pat. No. 4,423,885 by Camey et al, entitled "Removable gooseneck trailer"; U.S. Pat. No. 4,618,307 by Kress et al, entitled "Scrap bucket carrier"; U.S. Pat. No. 5,326,214 by Swisher, entitled "Method and apparatus for handling a cutter or the like"; U.S. Pat. No. 5,667,231 by Dierks et al, entitled "Trailer"; U.S. Pat. No. 5,775,713 by Peterson et al, entitled "Collapsible goose-neck van trailer"; U.S. Pat. No. 6,378,887 by Landoll et al, entitled "Gooseneck lift mechanism"; U.S. Pat. No. 7,112,029 by Neatherlin, entitled "Carrier apparatus and method"; U.S. Pat. No. 7,544,033 by Mollhagen, entitled "Trailer"; U.S. Pat. No. 8,336,905 by Mollhagen et al, entitled "Trailer for transporting a livestock implement"; U.S. Pat. No. 9,440,624 by Lewis, entitled "Hydraulic lift device for trailer"; 2003/0044265 by French et al, entitled "Low loader trailer"; 2010/0019469 by Groves, entitled "Trailer with adjustable elevation"; 2012/0056406 by Trowbridge et al, entitled "Gooseneck trailer with coupling link and latch actuators"; 2012/0056407 by Trowbridge et al, entitled "Hydraulically operated gooseneck trailer and latch assembly"; 2015/0283934 by Kern, entitled "Heavy-load transport vehicle for transporting an elongated object"; and EP0515294A1 by Morel, entitled "Swan-neck type separable articulated connection between a load carrying tractor and a semi-trailer for heavy vehicles".

While providing good utility for the ramp-style loading of heavy machinery onto the trailer, these prior art teachings undesirably add to the overall length of the trailer, while in some cases still either necessitating a disconnection and subsequent reconnection between the trailer and towing vehicle. Once again, there is no teaching or utility for application to lowering ice fishing house trailers to the ice while remaining coupled to a towing vehicle. Further lacking is the preservation of storage space above the gooseneck or fifth wheel coupling.

As may be apparent, in spite of the enormous advancements and substantial research and development that has been conducted in the field of ice fishing trailers, there still remains a need for an ice fishing house capable of being fitted with many amenities, necessitating a fifth wheel or gooseneck coupler, but which can remain connected to the towing vehicle during use.

In addition to the foregoing patents, Webster's New Universal Unabridged Dictionary, Second Edition copyright 1983, is incorporated herein by reference in entirety for the definitions of words and terms used herein.

SUMMARY OF THE INVENTION

In a first manifestation, the invention is, in combination, a towing vehicle, an ice fishing house, and a fifth wheel coupler securing the ice fishing house to the towing vehicle. The towing vehicle comprises: a motive power source configured to move the towing vehicle and the ice fishing house; and a fifth wheel hitch. The ice fishing house comprises: a wheel set configured to support at least a portion of the ice fishing house above a road when the ice fishing house is in a transport configuration and configured to lower at least a portion of the ice fishing house onto an ice surface when the ice fishing house is in a fishing configuration; a fish house body having an enclosure providing shelter and defining an enclosure interior and a floor; a portal through the floor configured to pass a fishing line and fish through; a fifth wheel kingpin coupled with the fifth wheel hitch; and a fifth wheel fish house height adjustable connection configured to elevate at least a portion of the fish house body relative to the fifth wheel kingpin when the ice fishing house transitions from the fishing configuration to the transport configuration, and to lower at least a portion of the fish house body relative to the fifth wheel kingpin when the ice fishing house transitions from the transport configuration to the fishing configuration.

In a second manifestation, the invention is an ice fishing house. The ice fishing house comprises: a wheel set configured to support at least a portion of the ice fishing house above a road when the ice fishing house is in a transport configuration and configured to lower at least a portion of the ice fishing house onto an ice surface when the ice fishing house is in a fishing configuration; a fish house body having an enclosure providing shelter and defining an enclosure interior and a floor; a portal through the floor configured to pass a fishing line and fish through; a fifth wheel kingpin coupled with the fifth wheel hitch; and a fifth wheel fish house height adjustable connection configured to elevate at least a portion of the fish house body relative to the fifth wheel kingpin when the ice fishing house transitions from the fishing configuration to the transport configuration, and to lower at least a portion of the fish house body relative to the fifth wheel kingpin when the ice fishing house transitions from the transport configuration to the fishing configuration.

In a third manifestation, the invention is a method of a locating an ice fishing house trailer relative to an ice-covered body of water. The method comprises the steps of coupling the ice fishing house trailer to a towing vehicle through a fifth wheel coupler; towing the ice fishing house trailer at least partially across the ice-covered body of water, the ice fishing house trailer configured in a transport configuration having an ice fishing trailer body of the ice fishing house trailer elevated above the ice and having a trailer wheel set in contact with the ice-covered body of water throughout the towing step; shifting the ice fishing trailer body of the ice fishing house trailer lower relative to the fifth wheel coupler; and lowering the ice fishing trailer body relative to the trailer wheel set to bring the ice fishing trailer body to rest upon the ice-covered body of water. The fifth wheel coupler couples the ice fishing house trailer to the towing vehicle throughout the towing, shifting, and lowering steps.

OBJECTS OF THE INVENTION

Exemplary embodiments of the present invention solve inadequacies of the prior art by providing an ice fishing house capable of being fitted with many amenities and further capable of towing additional trailers therebehind, necessitating a fifth wheel or gooseneck coupler that remains connected to the towing vehicle both during transport over a roadway and during stationary use upon a frozen surface of a body of water. In addition, storage space above the fifth wheel or gooseneck coupler is provided and preserved, thereby reducing the overall length of the trailer.

The present invention and the preferred and alternative embodiments have been developed with a number of objectives in mind. While not all of these objectives are found in every embodiment, these objectives nevertheless provide a sense of the general intent and the many possible benefits that are available from embodiments of the present invention.

A first object of the invention is to provide an ice fishing trailer extensively equipped with amenities that remains coupled to a towing vehicle both during transport and while in use on a frozen surface of a body of water. A second object of the invention is to provide storage in fixed position above a gooseneck or fifth wheel coupler. Another object of the present invention is to enable relative movement along a vertical axis between a main ice fishing trailer body and the aforementioned fixed position storage, thereby allowing the main ice fishing trailer body to be lowered onto the ice while the trailer remains attached to the towing vehicle through the gooseneck or fifth wheel coupler. A further object of the invention is to provide the relative movement along a vertical axis through a driven parallelogram linkage that is strong, stable, secure, and readily actuated by a driving cylinder. Yet another object of the present invention is to lower the trailer body relative to the above-the-hitch-coupler storage compartment and then subsequently lower the trailer body relative to the trailer wheel set, to thereby lower the entire trailer body onto the ice surface. An additional object of the invention is to provide the option of coupling other trailers behind the ice fishing trailer.

BRIEF DESCRIPTION OF THE DRAWINGS

The foregoing and other objects, advantages, and novel features of the present invention can be understood and appreciated by reference to the following detailed description of the invention, taken in conjunction with the accompanying drawings, in which.

DESCRIPTION OF THE PREFERRED EMBODIMENT

Figure 1:
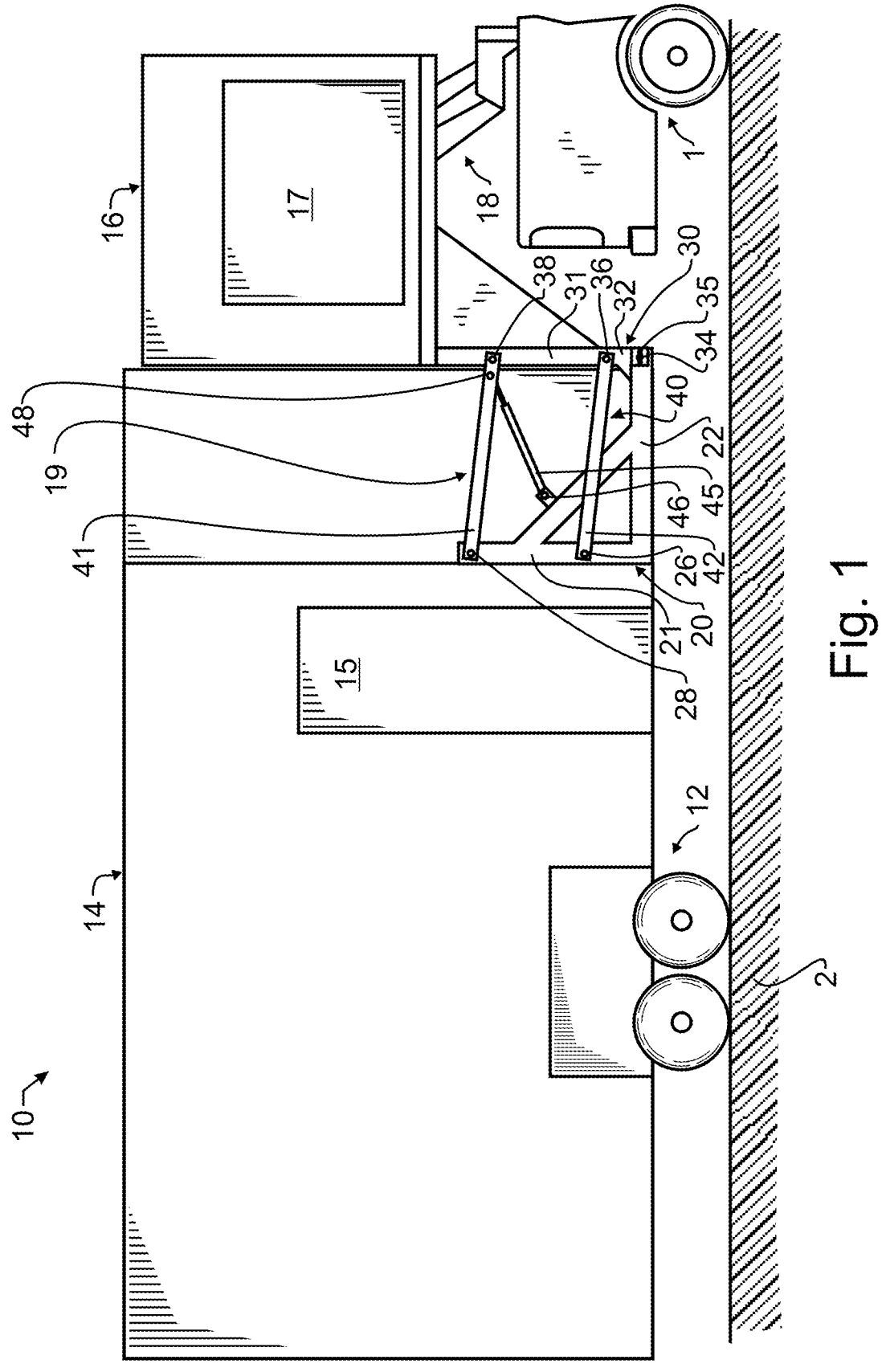
FIG. 1 illustrates a prior art towing vehicle in combination and coupled with a preferred embodiment ice fishing house having a fifth wheel fish house height adjustable connection designed in accord with the teachings of the present invention from a side elevational view and pinned in a transport position.
Figure 2:
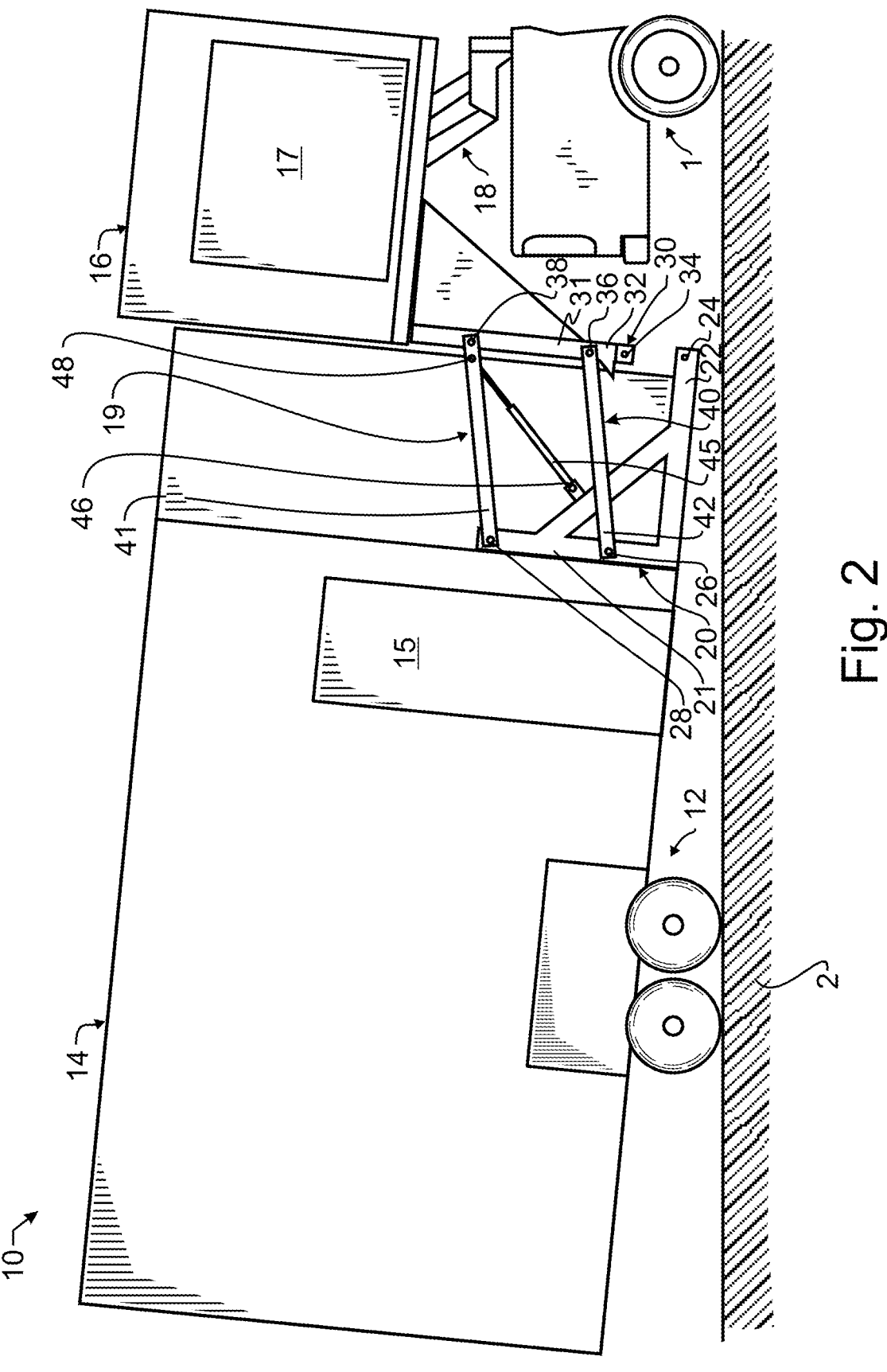
FIG. 2 illustrates the combination prior art towing vehicle and preferred embodiment ice fishing house having a fifth wheel fish house height adjustable connection of FIG. 1 from a side elevational view, with the ice fishing house partially lowered toward the ice.
Figure 3:
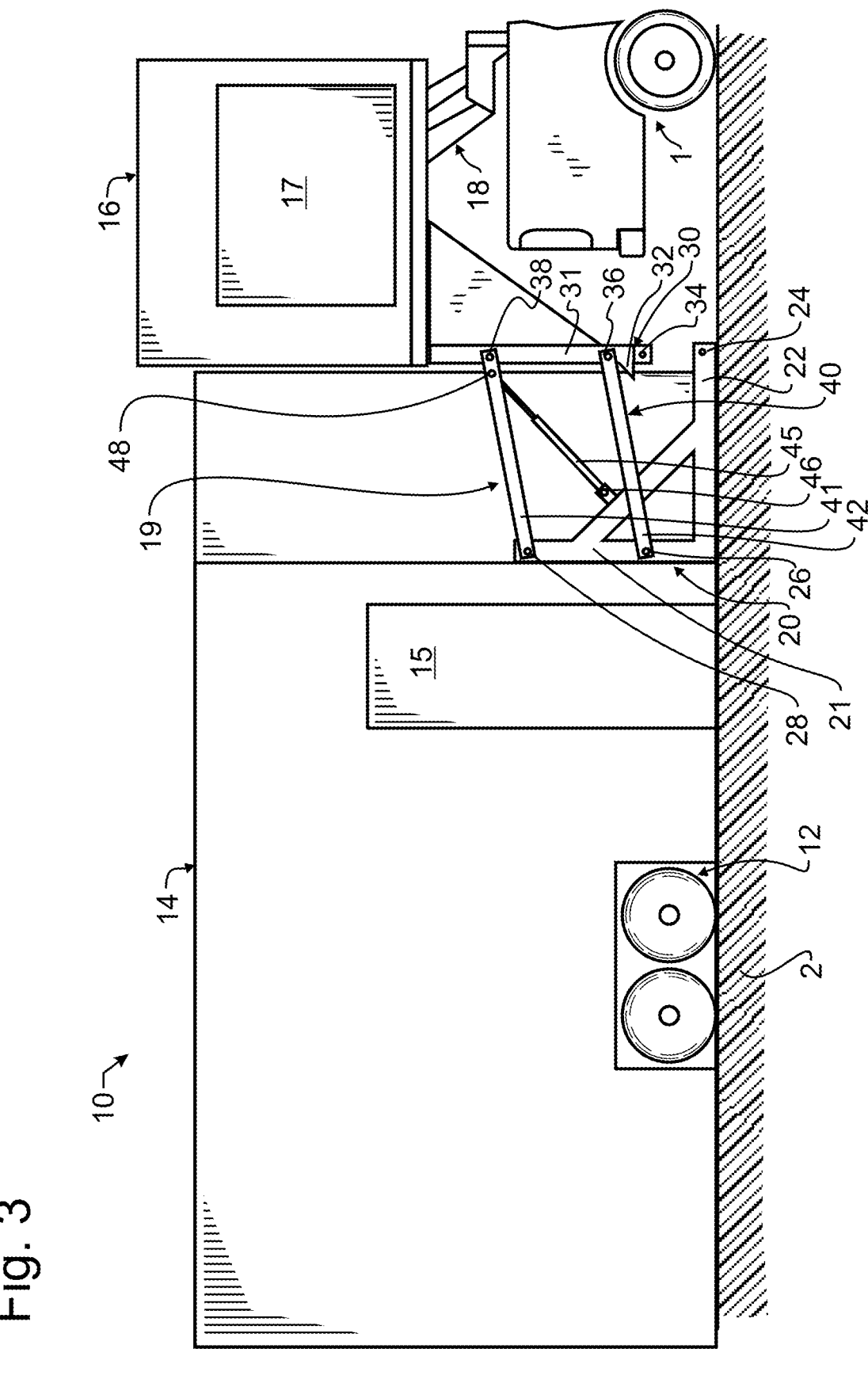
FIG. 3 illustrates the combination prior art towing vehicle and preferred embodiment ice fishing house having a fifth wheel fish house height adjustable connection of FIG. 1 from a side elevational view, with the ice fishing house fully lowered to the ice.

Manifested in the preferred embodiment, the present invention as illustrated in FIGS. 1-3 provides a prior art towing vehicle 1 in combination and coupled with a preferred embodiment ice fishing house 10 having a fifth wheel fish house height adjustable connection 19. Prior art towing vehicle 1, for exemplary and non-limiting purposes, is illustrated as a pick-up truck with a fifth wheel receiver contained within the bed. Nevertheless, other suitable towing vehicles and couplers are known in the art of towing that will be substituted therefor in alternative embodiments. As those skilled in the art will recognize, in some alternative embodiments of the present invention one such alternative coupling apparatus is a gooseneck hitch that can be fabricated to have similar load capacity ratings to that of a fifth wheel coupler, and that can be fabricated to be installed within the bed of a pickup truck.

Prior art towing vehicle 1 is illustrated as being stationary upon a layer of ice 2 that has formed on top of a body of water. Nevertheless, in the position illustrated in FIG. 1, prior art towing vehicle 1 coupled with a preferred embodiment ice fishing house 10 having a fifth wheel fish house height adjustable connection 19 may be moved either over the top of ice layer 2 or over roadways or other paths or routes that can be reasonably traversed by wheeled vehicles.

Preferred embodiment fifth wheel fish house 10 preferably has a wheel set 12 that is capable of being raised and lowered relative to fish house body 14. The numbers of wheels and axles incorporated into wheel set 12 is not critical to the present invention, providing reasonable load bearing and safety requirements as known in the art are met. Furthermore, the technique and apparatus used to raise and lower wheel set 12 relative to fish house body 14 is also not critical to the present invention, and can take many forms and structures as are known in the prior art, both as incorporated by reference herein above and as otherwise documented in the industry.

Fish house body 14 will, as known in the art, contain at least one floor opening or portal through which a fisherman may pass a fishing line, the fishing line in turn passing through the ice layer 2 and into the water beneath. While such holes or portals are notoriously well-known, for exemplary and non-limiting purpose one such portal 13 is illustrated in U.S. Pat. No. 2,473,076 by Scheibner, the teachings and contents which are incorporated herein by reference. One or more additional portals such as door 15 will preferably be provided, thereby allowing persons to access the generally enclosed interior of fish house body 14. Other portals such as windows or the like will in some embodiments be provided to allow persons to see in or out of fish house body 14, or to gain natural illumination, or for other purpose known in the art.

Conversion of the bed of a pickup truck to accommodate a fifth wheel coupler necessarily reduces the cargo capacity of the pickup bed. However, to better maintain overall storage and transport capacity, and to thereby maintain or enable as many amenities as desired within fish house body 14, a fifth wheel storage compartment 16 is provided that is substantially fixed in position relative to fifth wheel trailer pin box and kingpin 18. Fifth wheel storage compartment access door 17 provides a suitable access portal into fifth wheel storage compartment 16.

Fifth wheel trailer pin box and kingpin 18 provides engagement with the fifth wheel coupler mounted within the towing vehicle 1 bed. In some alternative embodiments, a gooseneck trailer coupler ball will be provided instead of a fifth wheel coupler, and in such embodiments fifth wheel trailer pin box and kingpin 18 will be replaced by a suitable gooseneck and gooseneck coupler. In other alternative embodiments, other suitable couplers will be provided.

Figure 4:
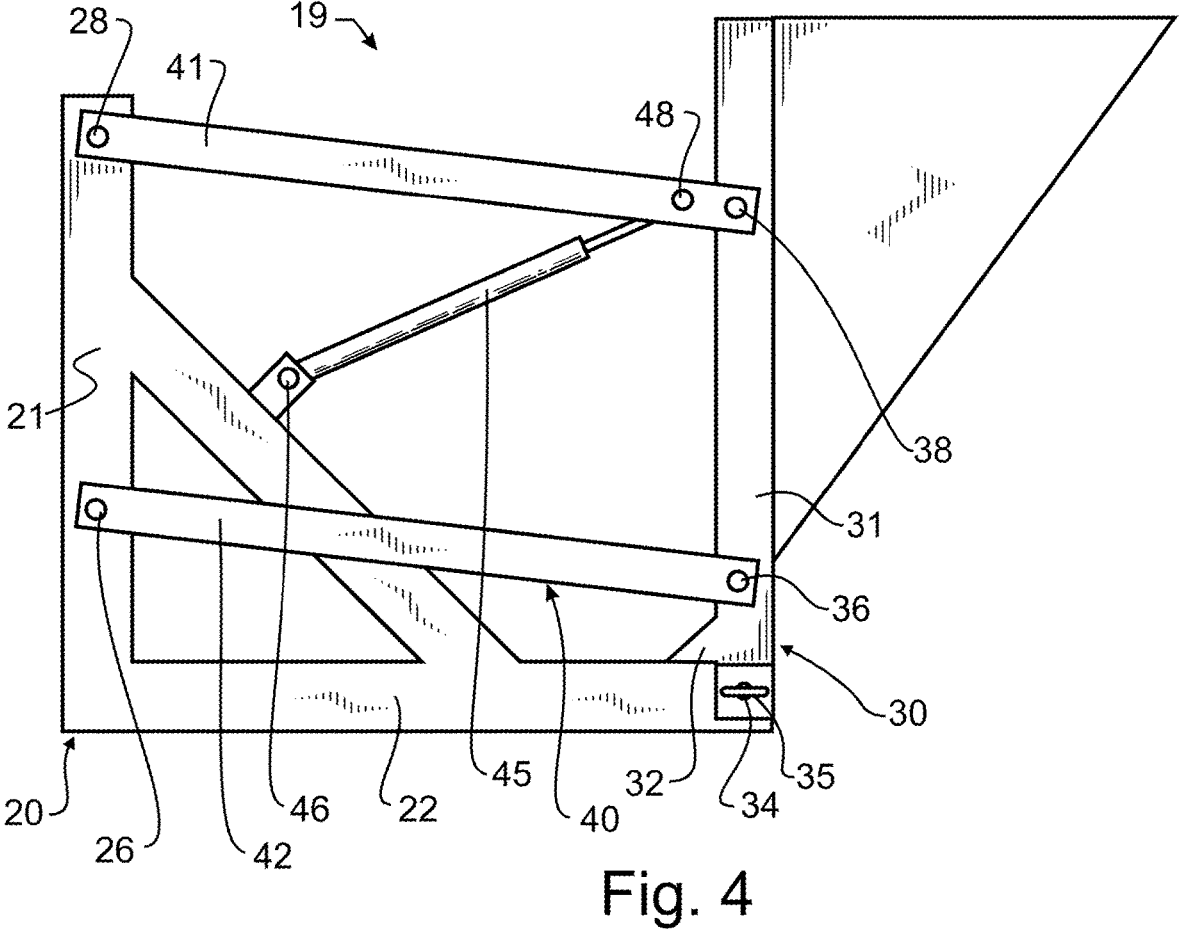
FIG. 4 illustrates the fifth wheel fish house height adjustable connection of FIG. 1 from a side elevational view, pinned in a transport position.
Figure 5:
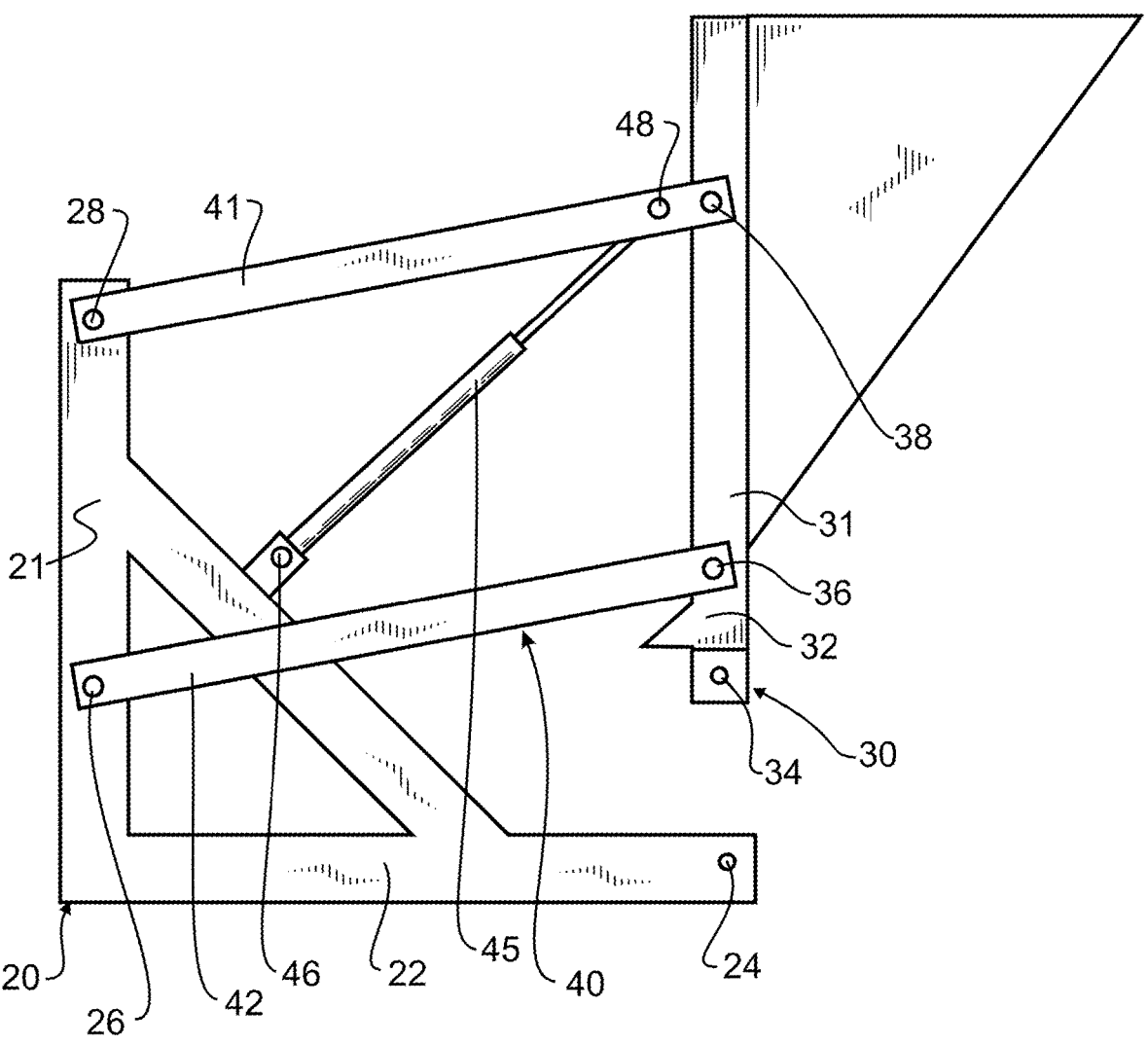
FIG. 5 illustrates the fifth wheel fish house height adjustable connection of FIGS. 4 and 5 from a side elevational view, fully lowered to the ice.

To allow fish house body 14 to lower from the travel position of FIGS. 1 and 4 to the lowered positions of FIGS. 2, 3, and 5, a height adjustable connection 19 is provided between fish house body 14 and fifth wheel storage compartment 16. As may be appreciated from FIGS. 1-3, any pivotal motion between the fifth wheel trailer pin box 18 and fish house body 14 about a horizontal and transverse axis, such axis which would be extending through and perpendicular or normal to the page as illustrated in FIGS. 1-3, would result in mechanical interference between the fifth wheel trailer pin box 18 and fish house body 14, effectively disabling the intended operation and movement of these components. In consideration thereof, height adjustable connection 19 will most preferably provide a substantially vertical shift or slide between fifth wheel trailer pin box 18 and fish house body 14, thereby allowing fish house body 14 to be lowered onto the ice while preferred embodiment fifth wheel fish house 10 remains attached to prior art towing vehicle 1 through the fifth wheel trailer pin box and kingpin 18.

While illustrated and numbered in FIGS. 1-3, FIGS. 4 and 5 provide an enlarged illustration of height adjustable connection 19. As visible therein, height adjustable connection 19 comprises three primary components: a vertically adjustable arm 20; a fixed arm 30; and a pivoting linkage 40 that moves vertically adjustable arm 20 relative to fixed arm 30.

Vertically adjustable arm 20 defines a generally vertically extending leg 21, and a generally horizontally extending leg 22. Additional suitable webbing or framework may be provided therebetween as desired or required to obtain suitable structural integrity while minimizing weight, such as the single diagonal web member illustrated. A pin receiving hole 24 is located near the termination of leg 22, and is visible in FIGS. 2 and 5. A pair of pintles 26, 28 are located in spaced apart relation along the vertically extending leg 21.

Fixed arm 30 defines a generally vertically extending leg 31, and a generally horizontally extending brace 32. A pin receiving hole 34 is located just below brace 32. A pair of pintles 36, 38 are located in spaced apart relation along the vertically extending leg 31.

Coupling vertically adjustable arm 20 to fixed arm 30 is pivoting linkage 40. Pivoting linkage 40 has a pair of parallel links 41, 42, a drive cylinder 45, and a pair of pintles 46, 48 that couple drive cylinder 45 to vertically adjustable arm 20 and fixed arm 30, respectively. The pair of pintles 26,

28 couple to a first end of parallel links 42, 41, respectively, while the pair of pintles 36, 38 couple to a second end of parallel links 42, 41, respectively.

The combination of vertically extending leg 21, vertically extending leg 31, and parallel links 41, 42 form a quadrilateral linkage. In operation, when drive cylinder 45 is retracted it will in turn raise vertically adjustable arm 20 relative to fixed arm 30 into the travel position of FIGS. 1 and 4. For added safety, a travel locking pin 35 visible in FIGS. 1 and 4 will be inserted through both of pin receiving hole 24 visible in FIGS. 2 and 5 and pin receiving hole 34. Travel locking pin 35, or in alternative embodiments other suitable removable fasteners known in the mechanical arts to readily and securely fasten vertically adjustable arm 20 in position relative to fixed arm 30, will be used to ensure that, regardless of the operational state of drive cylinder 45, fish house body 14 will always remain raised above the ground or roadway. Horizontally extending brace 32 is configured in this same travel position to engage with the top edge of horizontally extending leg 22, providing a solid coupling therebetween.

Once at an intended ice or other destination, travel locking pin 35 will be removed from both of pin receiving hole 24 and pin receiving hole 34. Next, drive cylinder 45 is extended, and will lower vertically adjustable arm 20 relative to fixed arm 30 to allow fish house body 14 to lower into the lowered positions of FIGS. 2, 3, and 5.

In preferred embodiment fifth wheel fish house 10, drive cylinder 45 is a double acting hydraulic cylinder. However, in alternative embodiments drive cylinder 45 will for exemplary and non-limiting purpose comprise one or several pneumatic, hydraulic, or electric cylinders, and in other alternative embodiments, cable arrangements will provide the desired motive power.

While not immediately apparent from the Figures, the selection of dimensions, relative proportions, and angular relationships have a substantial impact on the effectiveness of pivoting linkage 40. Pivoting linkage 40 has a pair of parallel links 41, 42 that are as illustrated in the Figures preferably longer than a distance between pintles 26, 28, and also are preferably longer than a distance between pintles 36, 38. In addition, and most preferably, the angular rotation of parallel links 41, 42 is designed to be kept to a minimum. As illustrated, the angular rotation of parallel links 41, 42 away from horizontal is preferably limited to less than an approximate 15 degree angle.

The shortening of the horizontal component of parallel links 41, 42, which translates to the shift along the travel axis between fish house body 14 and fifth wheel storage compartment 16, is defined by the mathematical sine of 90 degrees minus the angular offset. For an offset of 15 degrees in either direction, the sine of the resulting 75 degree angle is approximately 0.966, meaning there is a shift in the direction of travel that is only 3.4% of the length of parallel link 41 between pintles 28 and 38. However, the vertical displacement is defined by the cosine, which for this same 75 degree angle is approximately 0.26. In other words, the vertical shift is approximately 26% of the length of parallel link 41 between pintles 28 and 38. Said another way, limiting the extent of angular rotation of parallel links 41, 42 away from horizontal to less than fifteen degrees means that the vertical shift of vertically adjustable arm 20 relative to fixed arm 30 is approximately nine times as great as the longitudinal shift. As a result, this quadrilateral linkage, when limited to a shift of approximately plus or minus fifteen degrees from horizontal, will shift substantially only vertically, with only a minor amount of longitudinal shift that can be compensated for by providing an adequate gap between fish house body 14 and fifth wheel storage compartment 16.

As can be appreciated now from the illustration of FIG. 1, the shift of parallel link 41 from horizontal is in a clockwise direction about pintle 28, and amounts to less than fifteen degrees of rotation. From FIGS. 2 and 3, the shift of parallel link 41 from horizontal is in a counter-clockwise direction about pintle 28, and also amounts to less than fifteen degrees of rotation.

While the foregoing details what is felt to be the preferred embodiment of the invention, no material limitations to the scope of the claimed invention are intended. Further, features and design alternatives that would be obvious to one of ordinary skill in the art are considered to be incorporated herein. The scope of the invention is set forth and particularly described in the claims herein below.

I claim:

1. In combination, a towing vehicle, an ice fishing house, and a fifth wheel coupler securing said ice fishing house to said towing vehicle, said towing vehicle comprising:

a motive power source configured to move said towing vehicle and said ice fishing house; and a fifth wheel hitch;

said ice fishing house comprising:

a wheel set configured to support at least a portion of said ice fishing house above a road when said ice fishing house is in a transport configuration and configured to lower at least a portion of said ice fishing house onto an ice surface when said ice fishing house is in a fishing configuration;

a fish house body having an enclosure providing shelter and defining an enclosure interior and a floor;

a portal through said floor configured to pass a fishing line and fish through;

a fifth wheel kingpin coupled with said fifth wheel hitch; and a fifth wheel fish house height adjustable connection configured to elevate at least a portion of said fish house body relative to said fifth wheel kingpin when said ice fishing house transitions from said fishing configuration to said transport configuration and to lower at least a portion of said fish house body relative to said fifth wheel kingpin when said ice fishing house transitions from said transport configuration to said fishing configuration wherein said fifth wheel fish house height adjustable connection further comprises:

a vertically adjustable arm having an adjustable arm vertically extending leg, an adjustable arm horizontally extending leg, a first pintle affixed with said adjustable arm vertically extending leg, and an adjustable arm second pintle affixed with said adjustable arm vertically extending leg and spaced apart from said first pintle;

a fixed arm having a fixed arm vertically extending leg, a fixed arm horizontally extending brace, a third pintle affixed with said fixed arm vertically extending leg, and a fourth pintle affixed with said fixed arm vertically extending leg and spaced apart from said third pintle; and a pivoting linkage having a first link affixed with said first pintle and affixed with said third pintle distal to said first pintle, and a drive cylinder configured to pivot said first link relative to said adjustable arm vertically extending leg.

2. The combination towing vehicle, ice fishing house, and fifth wheel coupler of claim 1, wherein said pivoting linkage further comprises:

a second link affixed with said second pintle and affixed with said fourth pintle distal to said second pintle, wherein said first and second links parallel with each other, wherein said first and second links, said adjustable arm vertically extending leg between said first and second pintles, and said fixed arm vertically extending leg between said third and fourth pintles defining in combination a quadrilateral linkage, and wherein said quadrilateral linkage is configured to reciprocate said fish house body along a substantially vertical path relative to said fifth wheel kingpin.

3. The combination towing vehicle, ice fishing house, and fifth wheel coupler of claim 2, wherein said first and second links each define a longitudinal axis that deviates from horizontal by less than fifteen degrees from horizontal when said ice fishing house transitions from said fishing configuration to said transport configuration.

4. The combination towing vehicle, ice fishing house, and fifth wheel coupler of claim 2, wherein said ice fishing house further comprises a fifth wheel storage compartment rigidly affixed with said fifth wheel kingpin.

5. The combination towing vehicle, ice fishing house, and fifth wheel coupler of claim 2, wherein said quadrilateral linkage comprises a parallelogram.

6. The combination towing vehicle, ice fishing house, and fifth wheel coupler of claim 5, wherein said drive cylinder comprises a double acting hydraulic cylinder.

7. The combination towing vehicle, ice fishing house, and fifth wheel coupler of claim 1, wherein said drive cylinder is coupled on a first end through a fifth pintle to said vertically adjustable arm, and on a second end distal to said drive cylinder first end through a sixth pintle to said first link.

8. The combination towing vehicle, ice fishing house, and fifth wheel coupler of claim 1, further comprising:

an adjustable arm pin receiving hole in said adjustable arm horizontally extending leg;

a fixed arm pin receiving hole in said fixed arm vertically extending leg; and a travel locking pin passing through both of said adjustable arm pin receiving hole and said fixed arm pin receiving hole when said ice fishing house is in said transport configuration.

* * * * *